G. R. VAUGHAN.
PNEUMATIC TIRE.
APPLICATION FILED DEC. 20, 1910.
1,015,599.
Patented Jan. 23, 1912.
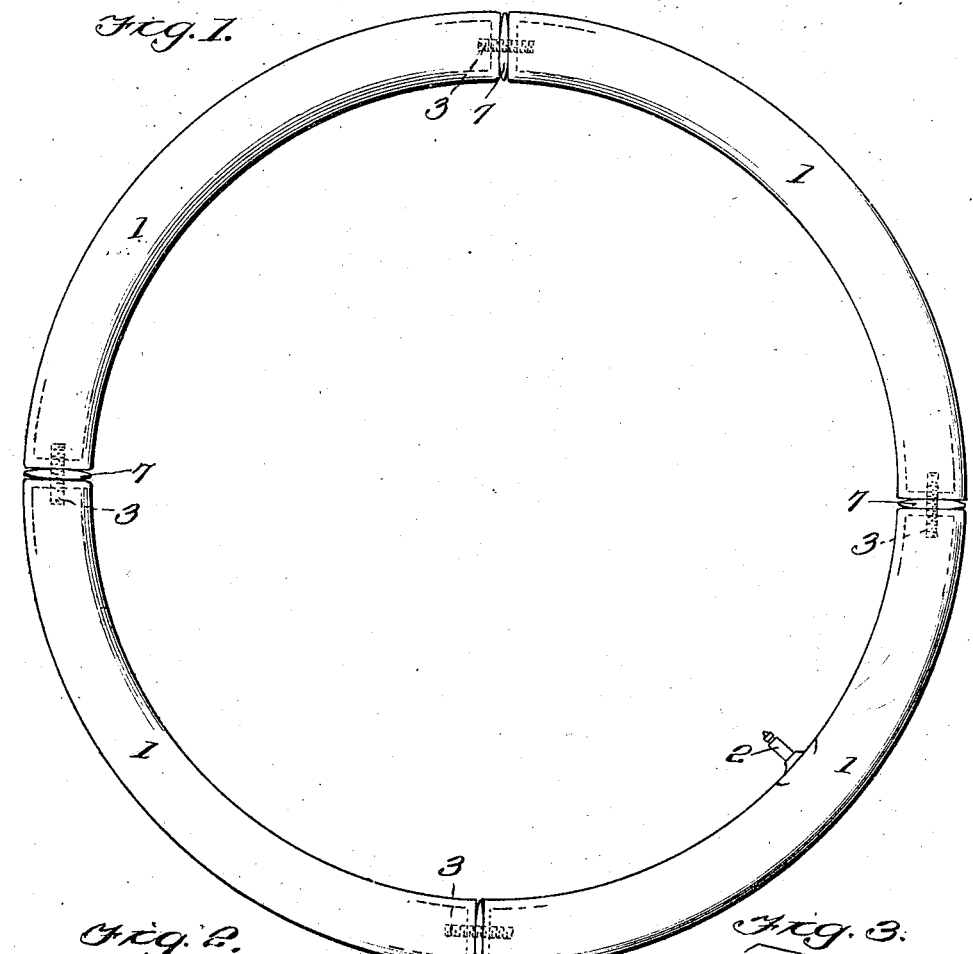
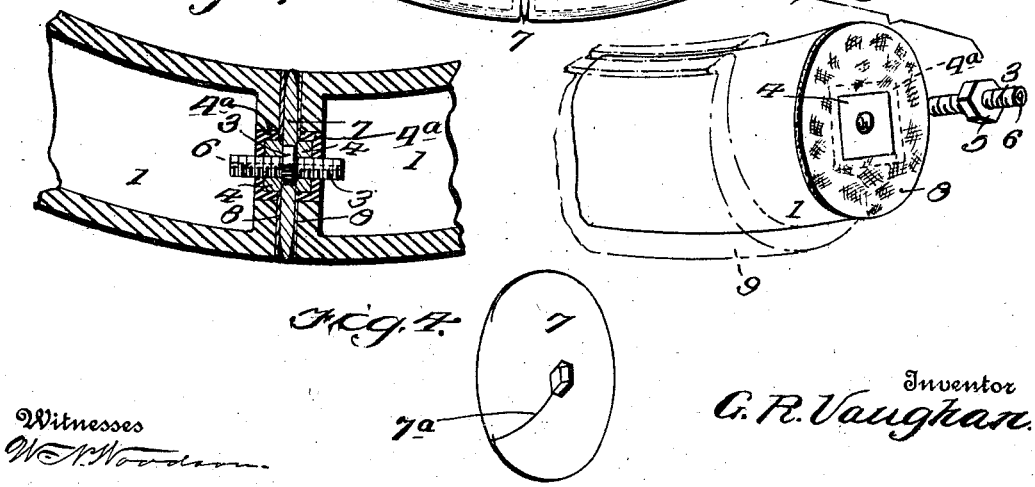
Witnesses
Inventor
G. R. Vaughan.
By
Attorney

UNITED STATES PATENT OFFICE.

GEORGE R. VAUGHAN, OF JEFFERSON CITY, MISSOURI.

PNEUMATIC TIRE.

1,015,599.　　　Specification of Letters Patent.　　Patented Jan. 23, 1912.

Application filed December 20, 1910. Serial No. 598,354.

*To all whom it may concern:*

Be it known that I, GEORGE R. VAUGHAN, a citizen of the United States, residing at Jefferson City, in the county of Cole and State of Missouri, have invented certain new and useful Improvements in Pneumatic Tires, of which the following is a specification.

The present invention comprehends certain new and useful improvements in pneumatic tires for use on automobiles or like vehicles, and the invention aims to provide an improved inner tube consisting of a plurality of separate inflatable sections which are connected together in a particularly efficient manner so as to enable any one of the sections to be conveniently removed and replaced by a new section in case of a blowout or puncture, without disturbing the remaining sections. This, of course, effects a material economy in the cost of maintenance of the tire.

Another object of the invention is to establish communication between the inflatable sections through the medium of the connecting means and thus enable the entire inner tube to be inflated at one time and permit the air to flow from one section to another to compensate for inequalities in pressure.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a side elevation of my improved inner tube; Fig. 2 is a fragmentary longitudinal section illustrating the connection between adjacent sections of the tube; Fig. 3 is a perspective view showing the end portion of one of the inflatable sections and the coupling bolt in juxtaposition, the casing being indicated in dotted lines in position around said section; and, Fig. 4 is a detail perspective view of one of the washers detached.

Corresponding and like parts are referred to in the following description and indicated in all the views of the accompanying drawing by the same reference characters.

In carrying out the present invention I provide a plurality of separate sections 1 which are formed of rubber or other suitable substance or material capable of being inflated, and which are placed end to end to constitute a complete inner tube of annular contour. One of these sections is provided with an inflation valve 2 of any approved construction or design. The connection between the meeting ends of each pair of adjacent sections is effected through the medium of a coupling bolt 3 having its end portions oppositely screw threaded to engage with nuts 4. The nuts are vulcanized in the ends of the inflatable sections and are substantially inclosed by the rubber, as indicated at 4ª. Sufficient hard rubber is provided around each nut so as to prevent the thin tubing from coming in contact therewith and being abraded thereby. At its middle point the coupling bolt is formed with a collar 5 which is angular in cross section and is adapted to be engaged by a thin flat wrench or spanner. By operating the wrench the bolt may be turned in one direction or the other so as to draw the sections together or to be entirely disengaged therefrom. The bolt has an axially extending bore 6 in order to establish communication between the interior of the inflatable sections, in addition to its primary function to detachably connect the sections together. By virtue of this arrangement the entire inner tube is inflated at one time and it is unnecessary to inflate each section separately. Furthermore the air may pass from one section to another to compensate for any difference in pressure, and thus insure a maximum resiliency.

One or more washers 7 of rubber or leather are placed on the middle portion of each bolt after the sections have been drawn together, for the purpose of filling the slight space between the sections and to prevent any leakage at the joint. Each washer is tapered in cross section from the center to the circumference and is split radially, as at 7ª so as to be capable of being mounted on and removed from the bolt, as required.

Attention is particularly directed to the fact that the ends of the sections of the tire lie in radial planes with respect to the center of the wheel. Furthermore, the coupling bolts are mounted substantially concentrically to the axis of the tire, while the collar 5 on each bolt is disposed perpendicularly with respect to the length of the bolt. By virtue of this arrangement each collar rotates in the plane of the joint so as to enable the sections to be drawn together until merely spaced apart a distance equal to the thickness of the collar. As the collars are not subjected to excessive strain they are made comparatively thin, and hence the gap between the sections is reduced to a minimum, whereby to permit the weight to be transferred from one section to the next adjacent section during the rotation of the wheel, without any appreciable vibration or jar at the joint between the sections. It is also to be noted that the ends of the sections are preferably covered with canvas or like fabric 8 so as to be materially reinforced and protected from undue wear through frictional contact with the washers.

The tire is completed by a casing or shoe 9 which is of conventional form and incloses all of the sections of the inner tube. The casing serves to exclude dirt, pebbles, and other foreign matter from the inner tube and prevents them from working in between the sections. The casing may be formed to engage with the rim of the wheel in any suitable manner.

From the foregoing description in connection with the accompanying drawing, the use of my improved tire will be apparent. When a blowout or puncture occurs, the outer casing 9 is first attached to afford access to the inner tube. The washers at the ends of the damaged section are removed and the coupling bolts are operated to release this section. The damaged section may be conveniently replaced by a new section by merely reversing the above operation, it being noted that it is unnecessary to disturb any of the remaining sections of the inner tube.

The convenience of this invention will be appreciated when it is considered that by incorporating a new section in the tire it becomes unnecessary to stop and repair the tire while on the road. If the damage is such as it may be repaired, it may be effected at some more convenient time, while on the other hand, if the damage cannot be repaired it is not necessary to discard the entire inner tube but merely the injured section. The tire is, therefore, very practical and efficient and quite economical in use. It will be further noted that the structure of the tire is simple, durable and strong.

Having thus described the invention, what I claim as new is:—

1. A pneumatic tire including a plurality of separate inflatable sections placed end to end, nuts provided in the meeting ends of the sections, a coupling bolt detachably connecting the meeting ends of each pair of adjacent sections and having screw-threaded end portions engaging the nuts, the middle portion of each bolt being angular in cross section to engage with a wrench, and means removably mounted on the intermediate portion of each bolt for filling the space between the sections.

2. A pneumatic tire including a plurality of separate inflatable sections placed end to end, nuts provided in the meeting ends of the sections, and a threaded coupling bolt connecting the meeting ends of each pair of adjacent sections and having screw-threaded end portions engaging with the nuts, the bolt being provided with an angular intermediate portion to engage with a wrench and being formed with a longitudinal passage establishing communication between the interior of the sections.

3. In a pneumatic tire, the combination with the meeting ends of flexible rubber tire sections, of nuts vulcanized in the meeting ends of said sections, hard rubber surrounding each of the nuts to prevent the same from coming into contact with the flexible rubber, and a screw-threaded coupling bolt engaging both nuts to detachably connect the tire sections together.

In testimony whereof, I affix my signature in presence of two witnesses.

GEORGE R. VAUGHAN. [L. S.]

Witnesses:
 JNO. P. GORDON,
 CLITUS V. ZUBER.